Feb. 14, 1967 W. L. LINKER ET AL 3,303,755
ACTUATOR POSITION INDICATORS
Filed March 16, 1964 2 Sheets-Sheet 2

INVENTORS
WILLIAM L. LINKER
RONALDS J. PLATT, JR.
BY
David D. McKenney
ATTORNEY

United States Patent Office 3,303,755
Patented Feb. 14, 1967

3,303,755
ACTUATOR POSITION INDICATORS
William L. Linker, Coventry, and Ronalds J. Platt, Jr., Providence, R.I., assignors to Grinnell Corporation, Providence, R.I., a corporation of Delaware
Filed Mar. 16, 1964, Ser. No. 352,198
4 Claims. (Cl. 92—5)

This invention relates to improvements in actuator position indicators. More particularly, it has to do with an improved indicator which is sealingly secured to one wall member of an actuator pressure chamber and passes therethrough to engage and be operated by the movable actuator member. In accordance with the principal features of the present invention, novel provision is made for preventing leakage around the opening in the chamber wall member, for adjustment of the indicator engagement by the movable actuator member, for bringing to the exterior of the chamber the information desired with respect to the movable actuator member, and for preventing damage to the indicator by the movable actuator member.

When actuators are employed, for example, to operate valves or the like, it is often necessary to know when the actuator is in a certain position. In the case of actuators driven by electric motors through some gear train or like arrangement this position indication problem is easily solved because some portion of the movable valve stem or of a member connected to it can be easily reached. However, in the case of pneumatic or hydraulic actuators, in which the movable members are often completely enclosed in fluid pressure chambers, a problem arises with respect to the sealing of any indicator which passes through one of the walls of such pressure chambers and which is moved by the movable actuator member. In some instances the portion of the movable actuator member rod which extends outside the pressure chambers for connection to the valve can operate a position indicator on the exterior of said chambers, but in many existing actuator-valve designs there is no opportunity to employ such a portion of this rod or of the valve stem.

As far as we are aware, in those cases where actuator position indicators have been used with fluid pressure actuators, each of the indicators has employed a member which is connected to or engaged by the movable actuator member and which moves sealingly through an aperture in one of the pressure chamber walls to the exterior of such chamber where its position can be observed or where it can operate an electric switch. One difficulty with this prior art arrangement is that seals must be provided for any indicator member moving with respect to the chamber wall, and in view of the fact that the pressure in the chamber tends to drive the indicator member out through the opening in the chamber wall the indicator member must be secured in some fashion to the movable actuator member. The present invention overcomes these difficulties and disadvantages by providing a small electric switch which is mounted in a housing small enough to be inserted through the pressure chamber wall and to be positioned so that the switch is actually located for direct engagement by the movable actuator member at one end of its stroke.

Another difficulty with the prior art is that where a remote indication of actuator position requires an electric switch, this switch has always been located, to our knowledge, outside the pressure chambers where some special covering or the like has been required to protect it from accidental damage. The present invention overcomes this difficulty by providing for remote indication with an electric switch which actually can be located inside a pressure chamber of the actuator whereby it is protected from damage to its mechanism without special provision.

In a preferred embodiment this housing is a hollow tubular member, exteriorly threaded, and the microswitch is partially embedded or "potted" in an interior plastic filling with its armature exposed and extending from the end of the housing. The electrical leads from the microswitch pass through and are similarly embedded in the plastic which fills the interior of the housing. An aperture in the actuator pressure chamber wall is preferably threaded to receive the exterior threads on the housing, and a suitable sealing member of known construction is applied in locknut fashion to prevent leakage of fluid from the chamber around the threads, to permit adjustment of the housing with respect to the pressure chamber wall and to lock the housing in the position selected.

Accordingly, it is one object of the present invention to provide an improved actuator position indicator which is inexpensive to manufacture, for which many existing fluid pressure actuators can be readily adapted, and which is reliable in service.

Another object is to provide an actuator position indicator of the kind described which comprises a body portion adjustably mounted in the wall of an actuator pressure chamber and carrying a microswitch at its interior end.

Another object is to provide an actuator position indicator of the kind described in which the body portion has a casing portion in the interior of which the microswitch and electrical leads therefor are embedded by a solid plastic filler material.

Another object is to provide an actuator position indicator of the kind described in which the casing is an exteriorly threaded hollow metal conduit having its interior filled with hardened plastic in which the microswitch and leads therefore are embedded and from one end of which the microswitch armature extends.

Other objects will appear hereinafter.

The best modes in which we have contemplated applying the principles of the present invention are illustrated in the accompanying drawings, but these are to be deemed primarily illustrative for it is intended that the patent cover by suitable expression in the appended claims whatever of patentable novelty exists in the invention disclosed.

Figure 2:
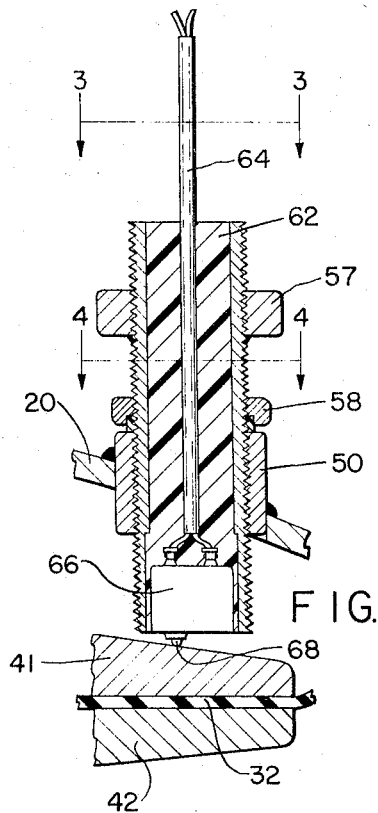
FIGURE 2 is a full cross-sectioned view of the indicator shown in FIG. 1 without the junction box.
Figure 5:
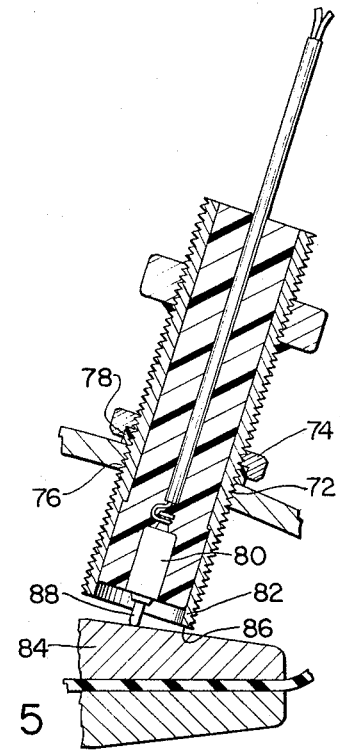
Figure 3:
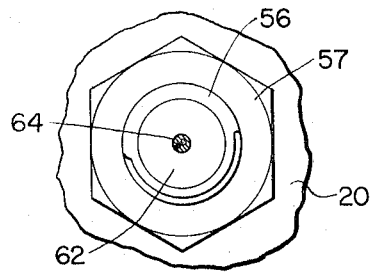
Figure 4:
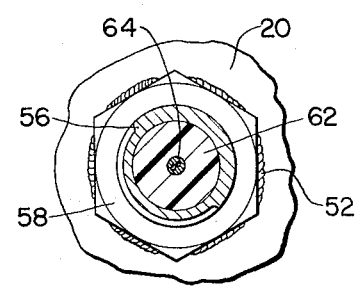

FIGURES 3 and 4 are cross-sectioned plan views taken on lines 3—3 and 4—4 respectively of FIG. 2; and, FIGURE 5 is a cross-sectioned side elevation view like FIG. 2 but showing another embodiment of the invention.

Referring now more particularly to the drawings, the numeral 10 generally designates a fluid pressure actuator of the type which is often used for actuation of valves and which is shown mounted on a diaphragm valve 12. The actuator chosen to illustrate this invention is of the double pressure chamber type in which fluid (air) pressure is led via the port 14 to a chamber 16 on the upper side of a diaphragm assembly 18 which together with an upper wall defines this upper chamber. More particularly, the actuator casing employs a pair of casing shells 20 and 22 secured together along their flanged edges 24 and 26 by nut and bolt assemblies 28 which draw these edges together and squeeze between them the peripheral edge 30 of a diaphragm 32.

The lower casing shell 22 has a boss 34 by which it is connected to the bonnet 36 of the valve 12, and a stem 38 connected to the center of the actuator diaphragm assembly 18 passes through a packing gland 40 in the boss 34 and enters the valve bonnet 12 where it is connected to the valve actuating mechanism (not shown).

The actuator diaphragm assembly is made up of the diaphragm 30 and a pair of plates 41 and 42 which are clamped to opposite sides of the diaphragm center portion and provide a rigid assembly to receive the upper end 43 of the rod 38. The diaphragm 32 is provided with a flexible roll 44 at its outer portions to permit movement of the diaphragm assembly when air pressure is introduced above or below it. A second port 45 leading into the lower fluid pressure chamber 46 provides entrance for air pressure which tends to lift the diaphragm assembly. When air is introduced into chamber 46 through port 45 air is simultaneously exhausted from chamber 16 through port 14 by valves not shown but of well known design, and similarly when air is introduced into the upper chamber 16 through the port 14 the lower chamber 46 is simultaneously exhausted through port 45, by the same valve network.

It will be seen from this actuator and valve construction that there is not much chance for obtaining an indication of the actuator and valve position via the valve-actuator stem 38 or from the valve actuating mechanism located within valve bonnet 12. Consequently, any attempt to obtain an indication of position elsewhere will involve penetration of one of the two chambers 16 or 46.

Figure 1:
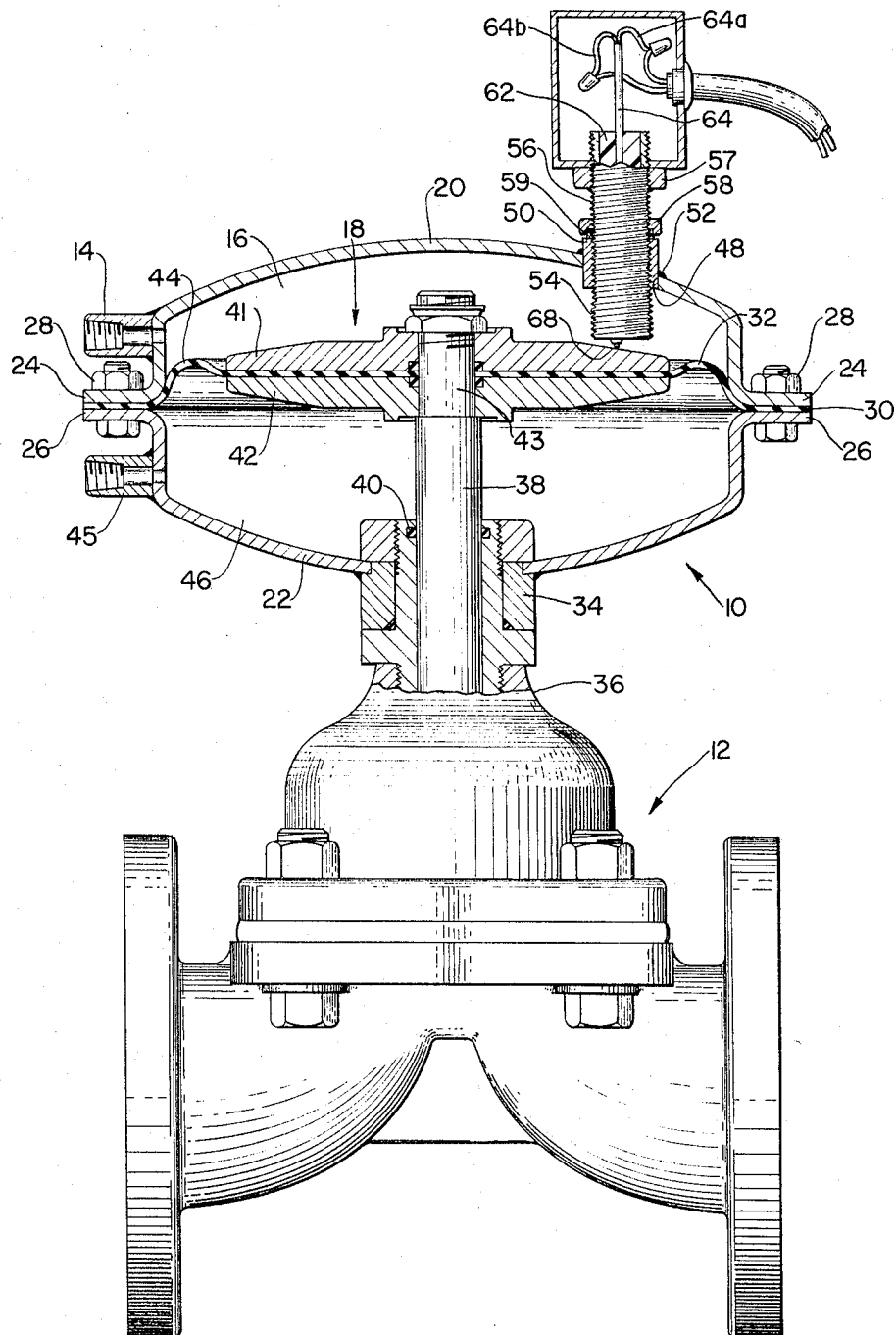
FIGURE 1 is a partially cross-sectioned side elevation view of one embodiment of the actuator position indicator in accordance with the present invention, this indicator being shown mounted on an actuator which in turn is mounted on a valve, and being shown with a junction box for electrical leads mounted on the indicator.

The embodiment of FIG. 1 of the present invention provides such an indicator which passes through an opening 48 cut in the casing shell 20 of the upper chamber 16, and in this particular embodiment furnished with a short sleeve 50 which is sealingly welded into this opening as indicated at 52. This sleeve is interiorly threaded and receives therein the exteriorly threaded tubing member which has a portion 54 extending below the opening 48 and sleeve 50 and into chamber 16. The tubing member has another portion 56 extending above the sleeve 50 as shown. In this upper portion last referred to the exterior threads receive a nut 57 welded thereto, and below this nut 57 is a lock nut 58 of the kind having a plastic washer 59 formed on the one side thereof. The tubing member 54 is threaded into the sleeve an amount determined by the uppermost position of the actuator piston. More particularly, this tubing member has its interior filled with a hardened plastic 62 such as the one of the well known room-temperature-curing epoxy resins suitable for potting. An example of such a resin is one manufactured by "Ren Plastics, Inc.," of Lansing, Michigan, and designated by that company "RP—1130A Laminating Mix (White)." It is recommended that the mixing ratio (by weight) be 11 parts resin to 2 parts of hardener. In this plastic there are embedded electrical leads 64 which extend down to a microswitch 66 having its armature 68 projecting downwardly below the bottom of the tubing for engagement by the plate 41. Depressing this armature closes the switch to give the indication desired through an electric circuit not shown. The adjustability provided by the exterior threads in the sleeve 50 is advantageous in view of the fact that the open positions of different valves vary and in many instances will change during use due to wear of the seating member.

The microswitch 66 is of a kind commonly available on the market, for example, a 1SX1-T (MS24547-1) switch, manufactured by the Micro-Switch Division of Minneapolis-Honeywell Regulator Company, Freeport, Illinois, and described on page 6 of that company's "Catalog 63d."

In this particular microswitch 66 the armature 68 is in the form of a plunger which is depressed into its housing to accomplish an electrical contact, for example a contact between wires 64a and 64b. The details of the internal switch mechanism form no part of the present invention.

FIGURE 5 illustrates another embodiment of the present invention in which the sleeve of theh earlier embodiment is eliminated. The principal reason for this sleeve was to keep the device generally parallel to the direction of motion of the movable actuator member. However, it is common to have the actuator casing of a curved design, and if this curvature is not too great the opening may be made generally at right angles to the surface of the casing shell, and this opening may be threaded as shown at 72 in FIGURE 5. The walls casing shells in these actuators are usually thick enough to provide several threads which is sufficient to hold the device of the present invention. In the embodiment of FIGURE 5 the lock washer 74 is merely brought up tight against the exterior surface of the casing shell. If desired when the hole 76 is drilled in the casing shell in FIGURE 5 the outer surface may be planed off somewhat in order to make sure that the plastic washer 78 makes a firm engagement.

FIGURE 5 also differs from FIGURES 1 to 4 in that the microswitch 80 is recessed into the end of the tubing 82 far enough to be protected against being damaged by the piston 84 arising higher than anticipated. The rim 86 of the tubing acts as a stop and prevents movements of the armature 88 which would injure the switch.

We claim:
1. In combination with a fluid pressure actuator having:
(I) a fluid pressure chamber defined by:
(A) a first wall movable through a range of positions,
(B) a second wall which:
(1) is opposite said first wall,
(2) has an aperture,
(II) an actuator position indicator having:
(A) a hollow elongated housing which:
(1) is mounted in said second wall aperture,
(2) has one end extending into said chamber,
(3) has a portion extending from the side of said second wall which is opposite said chamber,
(B) a switch which:
(1) is located in said one housing end,
(2) has an armature which:
(a) is presented toward said first movable wall,
(b) is engaged by said first movable wall in one position within said range of positions,
(C) a body of potting plastic which:
(1) is in said housing,
(2) is hardened,
(3) secures said switch to said housing,
(4) seals the interior of said housing against the passage of fluid therethrough from said chamber,
(D) means associated with said extending housing portion and said chamber wall for adjusting the position of said housing with respect to said wall.

2. The combination of claim 1 in which said adjusting means comprises external threads on said extending housing portion and corresponding internal threads on said wall aperture.

3. The combination of claim 2 in which said wall aperture is provided with a sleeve member and in which said internal threads are formed on the interior of said sleeve member.

4. The combination of claim 1 in which said switch is spaced inwardly from said one housing end and in which said housing end is engaged by said first movable wall in one of the positions thereof.

(References on following page)

References Cited by the Examiner

UNITED STATES PATENTS

| | | |
|---|---|---|
| 2,503,594 | 4/1950 | Phelps. |
| 2,568,561 | 9/1951 | Perdue et al. _____ 92—5 X |
| 2,591,852 | 4/1952 | Murray _____ 200—83.91 X |
| 2,640,977 | 6/1953 | Parisi _____ 200—83.91 X |
| 2,814,703 | 11/1957 | Martin _____ 200—168 |
| 2,834,845 | 5/1958 | Nielsen _____ 103—25 X |
| 2,842,644 | 7/1958 | Korsgren _____ 200—168 |
| 2,933,068 | 4/1960 | Johnson et al. _____ 92—5 X |
| 2,967,513 | 1/1961 | Chace. |

MARTIN P. SCHWADRON, *Primary Examiner.*

SAMUEL LEVINE, *Examiner.*

H. G. SHIELDS, I. C. COHEN, *Assistant Examiners.*